M. KERRIGAN.
CLOTHES LINE REEL AND STRETCHER.
APPLICATION FILED MAY 15, 1909.
938,388.
Patented Oct. 26, 1909.
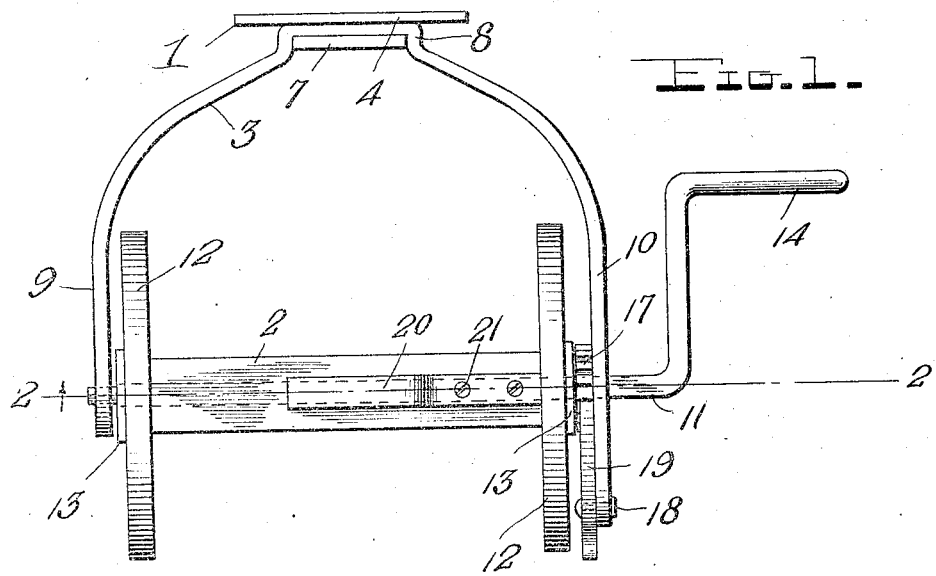
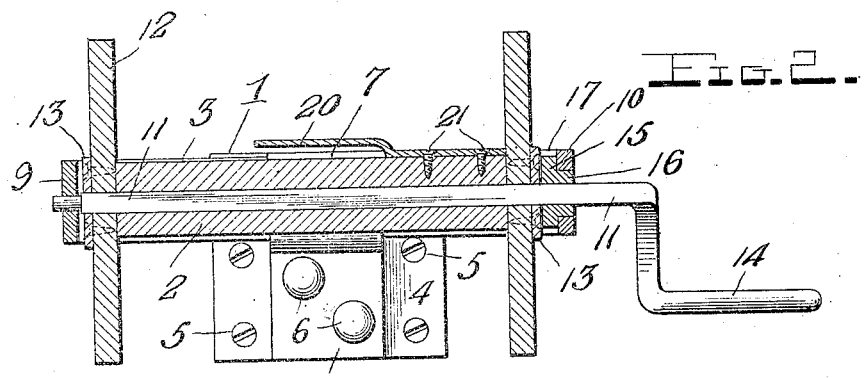
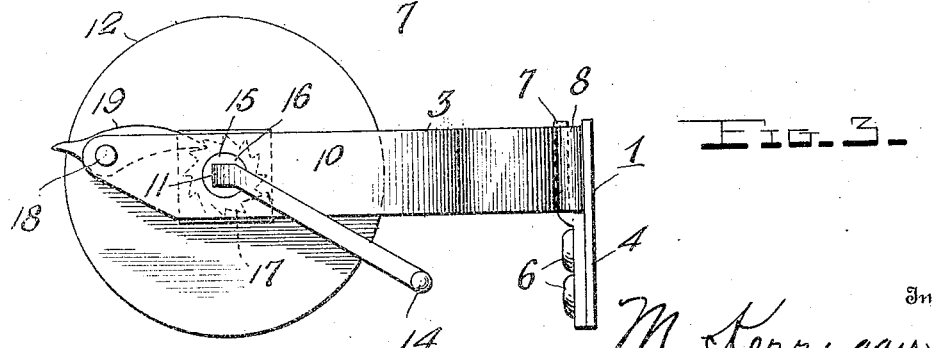

UNITED STATES PATENT OFFICE.

MICHAEL KERRIGAN, OF BROWNINGTON, MISSOURI.

CLOTHES-LINE REEL AND STRETCHER.

938,388.  Specification of Letters Patent.  Patented Oct. 26, 1909.

Application filed May 15, 1909. Serial No. 496,154.

*To all whom it may concern:*

Be it known that I, MICHAEL KERRIGAN, a citizen of the United States, residing at Brownington, in the county of Henry and State of Missouri, have invented certain new and useful Improvements in Clothes-Line Reels and Stretchers, of which the following is a specification, reference being had to the accompanying drawings.

This invention is an improved clothes line reel and stretcher and it consists in the novel features of construction and the combination and arrangement of parts hereinafter fully described and claimed.

The object of the invention is to improve and simplify the construction and operation of devices of this character and thereby render the same less expensive, stronger and more durable and convenient.

The above and other objects of the invention are attained in the construction illustrated in the accompanying drawings in which—

Figure 1 is a plan view of the improved clothes line reel and stretcher; Fig. 2 is a longitudinal section taken on the plane indicated by the line 2—2 in Fig. 1; and Fig. 3 is an end view.

The invention comprises an attaching frame or bracket 1, a reel and a supporting frame 3 for the reel, detachably engaged with the bracket 1. The latter is adapted to be secured on a post or any vertical support and comprises a rectangular plate 4 apertured at 5 to receive screws or other fastenings and having secured upon its central portion by rivets or the like 6, a plate 7, the upper portion of which is offset to provide a suspending hook for engagement by the reel carrying frame 3.

The frame is formed from a metal strap bent into U-shape and having its closed rear portion formed with an offset portion 8 to receive the hook portion 7 on the attaching bracket 1. The upwardly projecting horizontal ends or arms 9, 10 of the frame 3 receive the reel 2 between them and in the arm 9 is formed a small bearing opening for one end of a shaft 10 on which latter the reel is secured. The reel 2 is in the form of a spool and consists of a body of rectangular shape in cross section having circular heads or flanges 12 at its ends and a central opening to receive the shaft 11. The major portion of said shaft is preferably square in cross section and extends through similar shaped openings in metal plates 13 secured on the outer faces of the heads 12 concentric with the same, whereby the reel will rotate with the shaft. One extremity of the shaft is rounded to rotate in the bearing opening in the arm 9 of the frame 3 and its other end is bent to form a crank handle 14. Upon the last mentioned end of the shaft is arranged a collar or sleeve 15 having one end reduced to provide a cylindrical bearing hub 16 which rotates in a bearing opening in the arm 10 and its other end enlarged and provided with an annular series of teeth to provide a ratchet wheel 17. The sleeve 15 has a squared central opening to receive the shaft 11 so that it rotates with the shaft and its large inner end which forms the ratchet wheel 17 is disposed between the arm 10 and the metal plate 13 on the adjacent end of the reel 2. Pivoted at 18 upon the projecting outer end of the arm 10 is a dog or pawl 19 to engage the ratchet wheel 17. Said dog is pivoted adjacent to one of its ends so that its short end will project beyond the extremity of the arm 10 and form a finger piece which when depressed will throw the dog 19 over and out of engagement with the ratchet wheel.

For the purpose of permitting the clothes line to be readily fastened to the body portion of the reel 2 a clip 20 is secured thereto by screws 21 or other fastenings. Said clip is in the form of a metal plate arranged longitudinally of the body of the reel and having one of its ends secured and its other end offset and spaced from the body so that the clothes line may be readily engaged with it.

In operation when it is desired to set up a clothes line, its free end is suitably fixed, the pawl 19 is swung out of engagement with the ratchet wheel 17 and the frame 3 is carried to the support on which the bracket 1 is arranged. When said arm is thus carried the clothes line will unwind from the reel and when the bracket 1 is reached the offset portion 8 of said frame is engaged with the hook portion 7 on the bracket. The dog or pawl 19 is then swung into engagement with the ratchet wheel 17 and the crank 14 is turned to take up slack in the clothes line and stretch the latter. By reversing the above described operation the line may be wound up upon the reel and when wound the frame 3 may be detached from the bracket 1 and carried into the house or any sheltered place.

From the foregoing it will be seen that the invention provides an exceedingly simple device of this character which may be produced at a small cost and will be strong and durable in use.

Having thus described the invention what is claimed is:

A device of the character described comprising an apertured plate having an upwardly projecting hook, a U-shaped frame having its closed portion offset to detachably engage said hook on the attaching plate, the parallel ends or arms of said frame being formed with bearing openings, a reel having a body provided with a central opening and with heads at its ends, plates secured concentric on said heads of the reel and having flat faced openings, a flat faced shaft extending through the reel and the plates thereon, one end of said shaft being provided with a crank and the other with a cylindrical journal to rotate in the bearing opening in one of said arms, a sleeve having a flat faced central opening to receive the shaft, one end of said sleeve being reduced to provide a cylindrical journal to rotate in the bearing opening of the other of said arms, the other end of said collar being enlarged and formed with an annular series of ratchet teeth, and a pawl carried by the last mentioned arm of the frame and adapted to coact with said ratchet teeth.

In testimony whereof I hereunto affix my signature in the presence of two witnesses.

MICHAEL KERRIGAN.

Witnesses:
   JAS. W. DAVIS,
   JOHN MCGLADE.